(12) United States Patent  
Cameron et al.

(10) Patent No.: US 8,408,745 B2
(45) Date of Patent: Apr. 2, 2013

(54) ILLUMINATING AND TARGETING SYSTEMS AND METHODS HAVING VARIABLE LIQUID LENS

(75) Inventors: Mark Cameron, Snohomish, WA (US); Thomas R. Luce, Bothell, WA (US)

(73) Assignee: B.E. Meyers & Co. Inc., Redmond, WA (US)

( * ) Notice: Subject to any disclaimer, the term of this patent is extended or adjusted under 35 U.S.C. 154(b) by 218 days.

(21) Appl. No.: 12/882,472

(22) Filed: Sep. 15, 2010

(65) Prior Publication Data

US 2012/0063142 A1 Mar. 15, 2012

(51) Int. Cl.
*F21S 8/00* (2006.01)
(52) U.S. Cl. .......... 362/277; 362/257; 362/311.01; 362/311.03; 359/253
(58) Field of Classification Search .......... 362/277, 362/257, 311.01; 359/253
See application file for complete search history.

(56) References Cited

U.S. PATENT DOCUMENTS

| | | | | |
|---|---|---|---|---|
| 3,860,811 | A * | 1/1975 | Slauter | 362/202 |
| 7,515,350 | B2 * | 4/2009 | Berge et al. | 359/666 |
| 7,667,818 | B2 * | 2/2010 | Galstian et al. | 349/200 |
| 2009/0252485 | A1 * | 10/2009 | Tsuchiya | 396/200 |

* cited by examiner

*Primary Examiner* — Evan Dzierzynski
(74) *Attorney, Agent, or Firm* — McKenna Long & Aldridge LLP

(57) ABSTRACT

Systems and methods that incorporate a variable liquid lens are disclosed. In at least some embodiments, a light projecting system includes a light source, and a light processing assembly configured to receive a light beam from the light source and to project an output field. The light processing assembly includes at least one liquid lens configured to controllably process the light beam such that the output field is variable between a relatively-broader illuminating field and a relatively-narrower targeting field. In some embodiments, a controller may controllably adjust the at least one liquid lens to alternately provide the illuminating field and the targeting field, and may controllably adjust at least one dwell time to adjust a brightness of at least one of the illuminating and targeting fields, respectively.

20 Claims, 6 Drawing Sheets

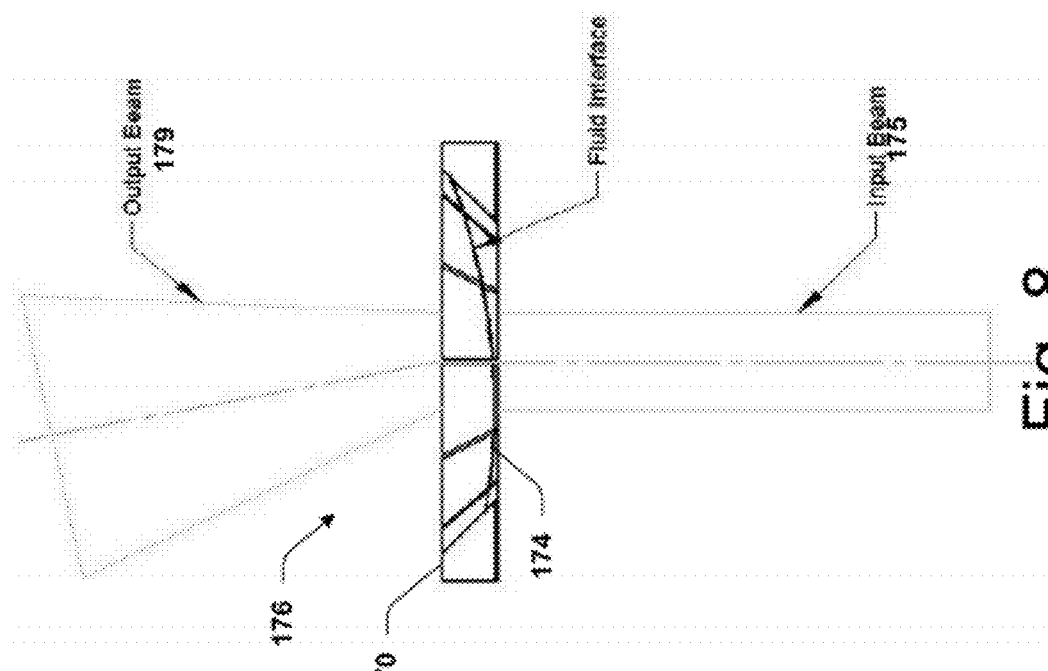
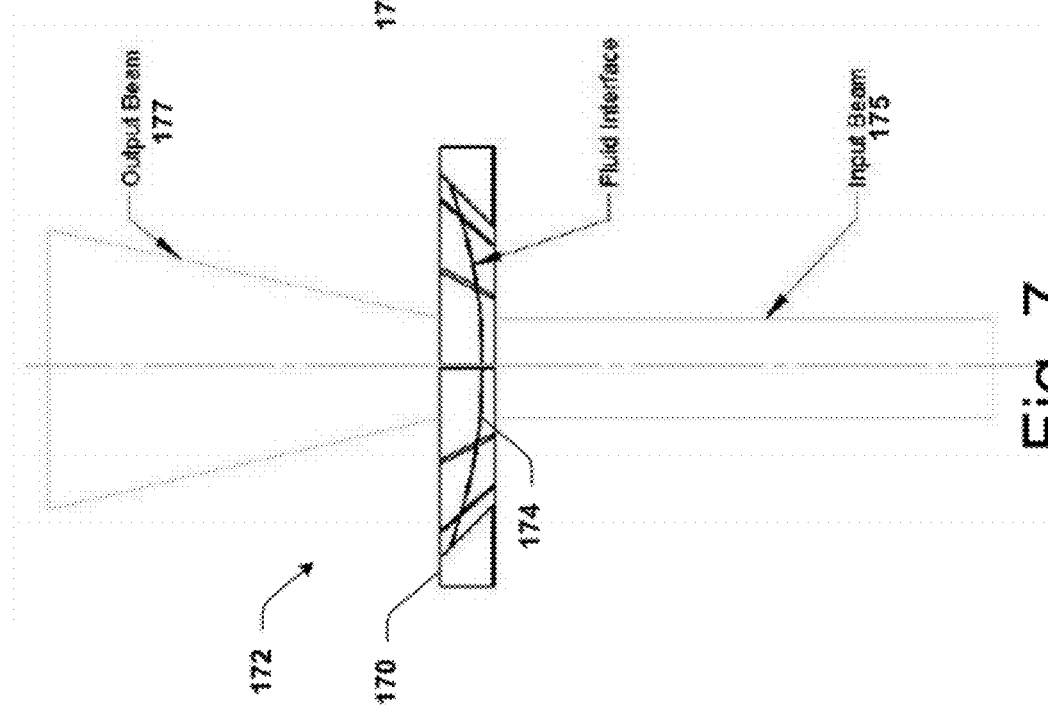

ILLUMINATING AND TARGETING SYSTEMS AND METHODS HAVING VARIABLE LIQUID LENS

FIELD OF THE INVENTION

The present disclosure is directed to systems and methods for illuminating and targeting that include a variable liquid lens.

BACKGROUND OF THE INVENTION

Conventional systems for illuminating or targeting may employ a laser or other suitable light source. In some circumstances, it is desirable to project both a broad illumination field for illuminating a target, and a more narrowly focused targeting field (or "spot") for aiming. Some conventional systems may include two lasers (one for illuminating and one for targeting), or alternately, a single laser and a lens assembly that focuses or adjusts a laser beam between an illuminating configuration and a targeting configuration, such as by mechanically moving a lens. Conventional systems for performing such illuminating and targeting functions include, for example, those systems described in U.S. Pat. No. 6,714, 564 issued to Meyers, U.S. Pat. No. 7,550,725 issued to Hollander and Baghai, and U.S. Pat. No. 4,876,816 issued to Triplett. Although desirable results have been achieved using such conventional systems, there is room for improvement.

SUMMARY

The present disclosure teaches systems and methods for illuminating and targeting that include a variable liquid lens. Embodiments of systems and methods in accordance with the teachings of the present disclosure may provide considerable improvements over conventional systems and methods, including improved maintainability, durability, and lighter weight. Other advantages that may be provided by systems and methods in accordance with the present disclosure will become apparent during review of the following disclosure.

In at least some embodiments, a light projecting system includes a light source, and a light processing assembly configured to receive a light beam from the light source and to project an output field. The light processing assembly includes at least one liquid lens configured to controllably process the light beam such that the output field is variable between a relatively-broader illuminating field and a relatively-narrower targeting field. In some embodiments, a controller may controllably adjust the at least one liquid lens to alternately provide the illuminating field and the targeting field, and may controllably adjust at least one dwell time to adjust a brightness of at least one of the illuminating and targeting fields, respectively. In further embodiments, one or both of the illuminating or targeting fields may be steered or directed by controllably adjusting the at least one liquid lens.

BRIEF DESCRIPTION OF THE DRAWINGS

Embodiments of the present disclosure are described in detail below with reference to the following drawings.

FIGS. 5 through 8 show side cross-sectional views of a liquid lens being controlled to various configurations to provide various output beam in accordance with the teachings of the present disclosure.

DETAILED DESCRIPTION

The present disclosure is directed to systems and methods for illuminating and targeting that include a variable liquid lens. Many specific details of certain embodiments in accordance with the present disclosure are set forth in the following description and in FIGS. 1-11 to provide a thorough understanding of such embodiments. One skilled in the art, however, will understand that the present invention may have additional embodiments, or that the invention may be practiced without several of the details described in the following description.

Figure 1:
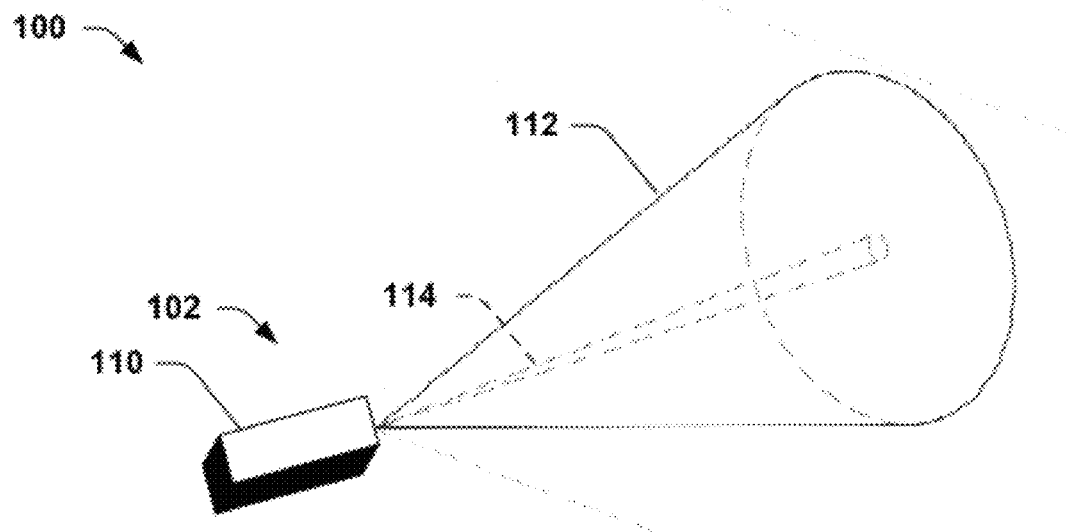
FIG. 1 is an isometric view of an exemplary embodiment of a system operating in a first mode of operation in accordance with the teachings of the present disclosure.
Figure 2:
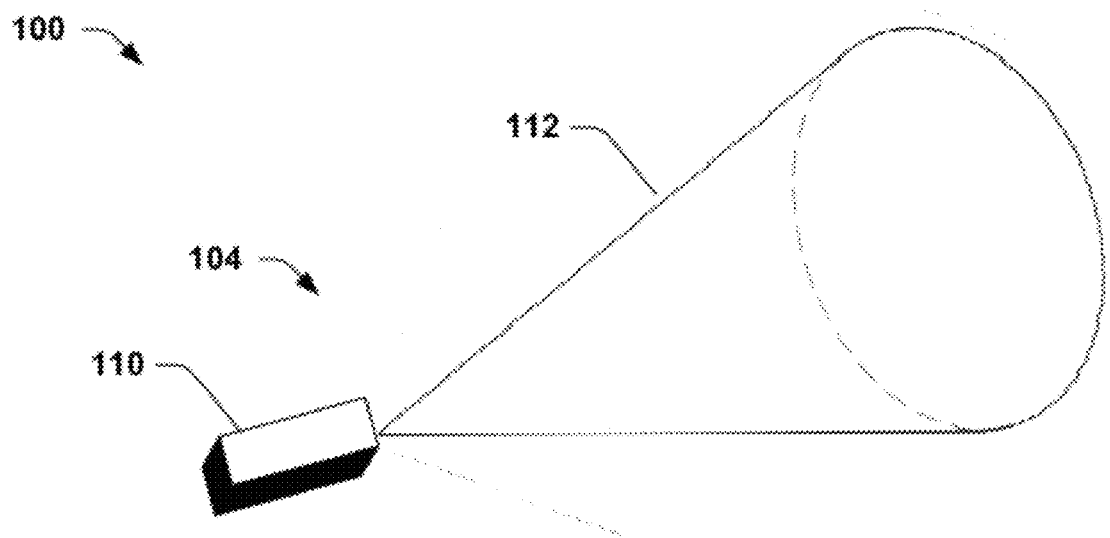
FIGS. 2 and 3 show the system of FIG. 1 operating in second and third modes of operation in accordance with the teachings of the present disclosure.
Figure 3:
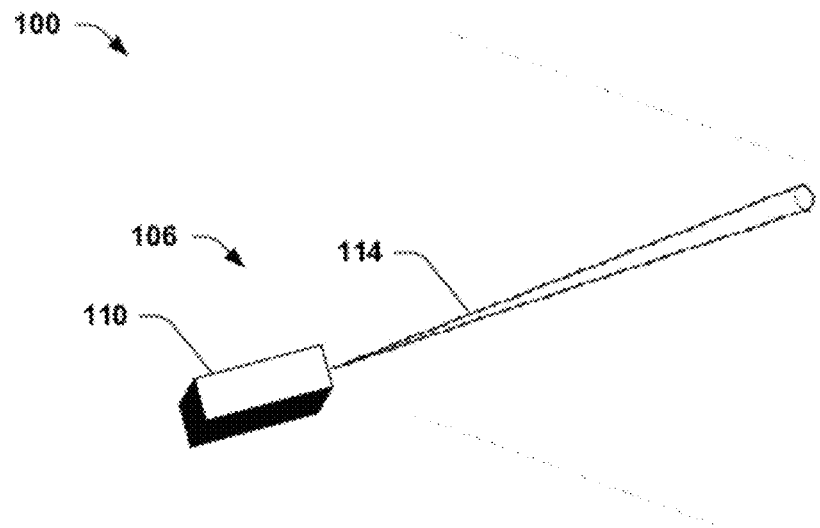

FIG. 1 is an isometric view of an exemplary embodiment of a system 100 operating in a first mode of operation 102 in accordance with the teachings of the present disclosure. In this embodiment, the system 100 is configured to project an illuminating field 112 and a targeting field 114. In the first mode of operation 102 shown in FIG. 1, the system 100 may project the illuminating and targeting fields 112, 114 such that the fields 112, 114 are or appear to be projected simultaneously. As shown in FIG. 2, in a second mode of operation 104, the system 100 may be operated to project only the illuminating field 112, while in a third mode of operation 106, the system 100 may be operated to project only the targeting field 114. In some embodiments, the fields 112, 114 may be formed using laser light, while in other embodiments, any other suitable source of light may be used.

More specifically, with reference to FIG. 1, the system 100 may operate in the first mode of operation 102 such that the illuminating and targeting fields 112, 114 are simultaneously projected, or are cycled at a suitably high frequency (e.g. 30 Hz, 60 Hz, etc.) such that the fields 112, 114 appear to an average human observer or viewing system to be projected substantially simultaneously. Typical uses for the system 100 operating in the first mode of operation 102 as shown in FIG. 1 may include weapon aiming, target identification, precision device alignment, or any other suitable uses. The targeting field 114 may allow a user or system to exactly indicate an object or area being targeted, while the illumination field 112 may allow the user or viewing system to see the object and/or surrounding area.

It will be appreciated that by quickly and repeatedly adjusting the beam width between the fields 112, 114 at a suitably high frequency, a user (or observer) or viewing system may perceive that both fields 112, 114 are projected simultaneously as depicted in FIG. 1, when in fact the fields 112, 114 are being rapidly alternated. Furthermore, in some embodiments, a control system may cause the system 100 to operate in an operating mode that includes a slight dwell time at or between the two adjustment extremes (narrow and wide), which may aid in impressing upon the observer or viewing system that the narrow and wide fields (e.g. targeting and illumination fields 114, 112) appear to exist simultaneously.

More specifically, in some embodiments, the control assembly may independently adjust at least one dwell time at the illuminating or targeting fields in order to independently adjust a brightness of the illuminating or targeting fields, respectively. Of course, in still further embodiments, the illuminating and targeting fields 112, 114 may in fact be projected simultaneously.

Figure 4:
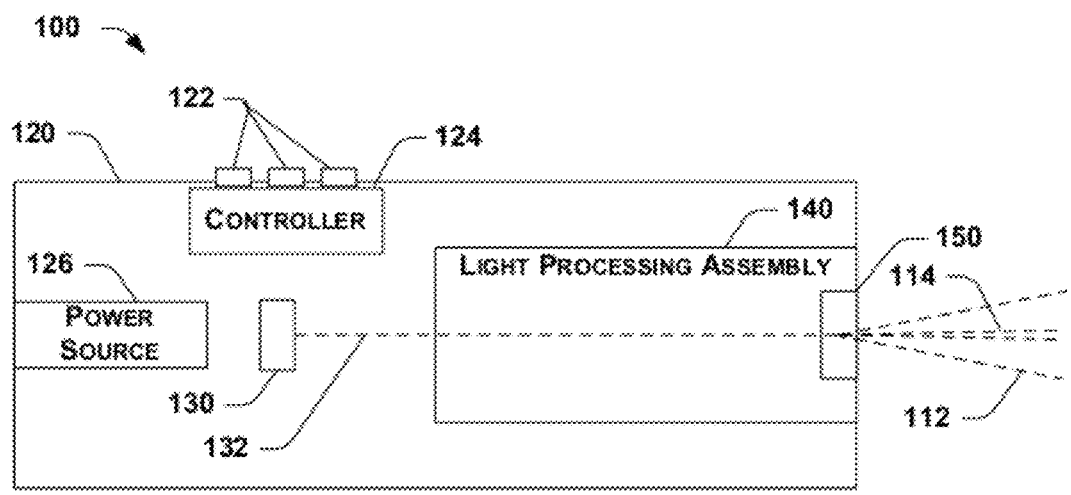
FIG. 4 is a side cross-sectional view of the exemplary system of FIG. 1 in accordance with the teachings of the present disclosure.

FIG. 4 presents a side cross-sectional view of the system 100 of FIG. 1. In this embodiment, the system 100 includes a housing 120 having one or more external controls 122 (three shown) that are operatively coupled to a controller 124. The external controls 122 may include, for example, an on-off control, pointing controls (e.g. horizontal and vertical aiming), mode controls (e.g. operating mode selector), or any other suitable controls. The system 100 may include a power source 126, or alternately, the system 100 may be coupled to a suitable external power source (not shown).

A light source 130 is disposed within the housing 120 and may be operatively coupled to one or more of the power source 126 and the controller 124. In some embodiments, the light source 130 may include a laser (e.g. laser diode), another type of coherent light source, or any other suitable source of light. The light source 130 may be configured to project a light beam 132 to a light processing assembly 140. The light processing assembly 140 may also be operatively coupled to one or more of the power source 126 and the controller 124. For the sake of clarity, wires or other suitable connectors that operatively couple the components of the system 100 are omitted from FIG. 4.

The light processing assembly 140 may include a variety of components that may be used to condition the light beam 132 from the light source 130. For example, in some embodiments, the light processing assembly 140 may include one or more optical components (e.g. lenses) for collimating, focusing, spreading, or otherwise conditioning the light beam 132, or one or more filters for filtering, splitting, attenuating, polarizing, or otherwise processing the light beam 132, or any other suitable components. Exemplary components that may be included within the light processing assembly 140 include, for example, those components described in U.S. Pat. No. 6,714,564 issued to Meyers, U.S. Pat. No. 7,550,725 issued to Hollander and Baghai, and U.S. Pat. No. 4,876,816 issued to Triplett, which patents are incorporated herein by reference.

As further shown in FIG. 4, in this embodiment, the light processing assembly 140 includes a liquid lens 150. The liquid lens 150 is suitably variable such that the light beam 132 may be variably projected from the housing 120 at a variable size. For example, in some embodiments, the liquid lens 150 may be controllably adjusted to form the illuminating field 112, the targeting field 114, or both fields simultaneously. In alternate embodiments, other fields or field shapes may be formed, including fields larger than the illuminating field 112 shown in FIGS. 1 and 2, or smaller than the targeting field 114 shown in FIGS. 1 and 3, or any field sizes intermediate between the illuminating and targeting fields 112, 114.

The adjustment of the liquid lens 150 to provide the desired field(s) may be accomplished in a variety of ways depending upon the particular characteristics of the liquid lens 150. Preferably, the liquid lens 150 is configured to be variably adjusted relatively rapidly without at least some of the difficulties associated with physical movement of optical components as with conventional systems and methods. More specifically, in at least some embodiments, the liquid lens 150 may be variably adjusted between a first configuration that may be used to project an illuminating field, and a second configuration that may be used to project a targeting field, in an oscillatory manner For example, in some embodiments, the liquid lens 150 may include two (or more) non-miscible liquids, at least one of the liquids being electrically conductive. Typically, liquid lenses of this type may be variably focused by controllably adjusting a voltage applied across the electrically conductive liquid, as described, for example, in U.S. Pat. No. 7,515,350 issued to Berge et al., European Patent No. 1166157 issued to Berge, and U.S. Pat. No. 7,667,818 issued to Galstian et al., which patents are incorporated herein by reference.

Alternately, in some embodiments, the liquid lens 150 may include a non-electrically conductive liquid that may be variably focused by controllably adjusting an applied voltage. Liquid lenses of this type include those embodiments described, for example, in U.S. Pat. No. 7,605,984 issued to Yeh et al., which patent is incorporated herein by reference. In further embodiments, the liquid lens 150 may include one or more liquid crystal lenses that may be variably adjusted by controllably adjusting an applied voltage, such as those embodiments described, for example, in U.S. Pat. No. 7,388,822 issued to Ooi et al., U.S. Pat. No. 7,599,128 issued to Shimozono et al., and U.S. Pat. No. 6,882,482 issued to Ogasawara, which patents are incorporated herein by reference.

In still further embodiments, the liquid lens 150 may include a liquid-liquid interface that is varied in shape by one or more piezoelectric actuators. Liquid lenses of this type include those embodiments described, for example, in "A Rapidly Deformable Liquid Lens," by Oku and Ishikawa, SPIE, 14 Dec. 2009, which technical paper is incorporated herein by reference. In other embodiments, the liquid lens 150 may include varying optical properties of a liquid layer by varying a pressure applied to the liquid, as described, for example, in U.S. Pat. No. 7,382,544 issued to Cernasov, which patent is incorporate herein by reference. Of course, in addition to those specific examples of types of liquid lenses described above, any other suitable liquid lenses may be employed. For example, suitable liquid lenses that may be used (or adapted for use) in systems and methods in accordance with the present disclosure include those products available from Varioptic, SA of Lyon, France, or from DMetrix, Inc. of Tucson, Ariz., or from Philips Research of Eindhoven, The Netherlands, or from any other suitable suppliers or sources.

Figure 5:
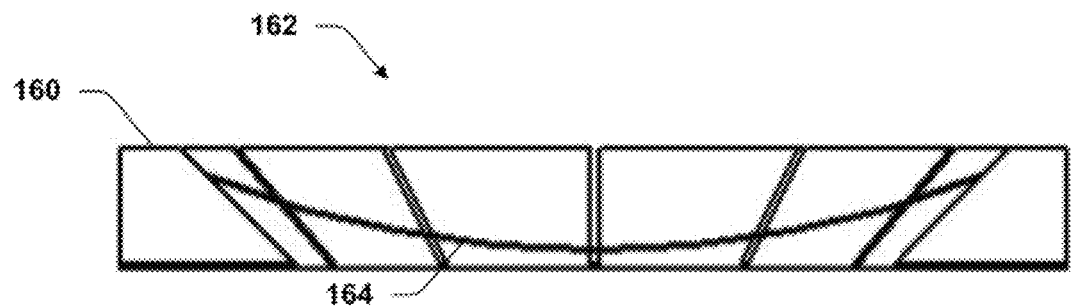
Figure 6:
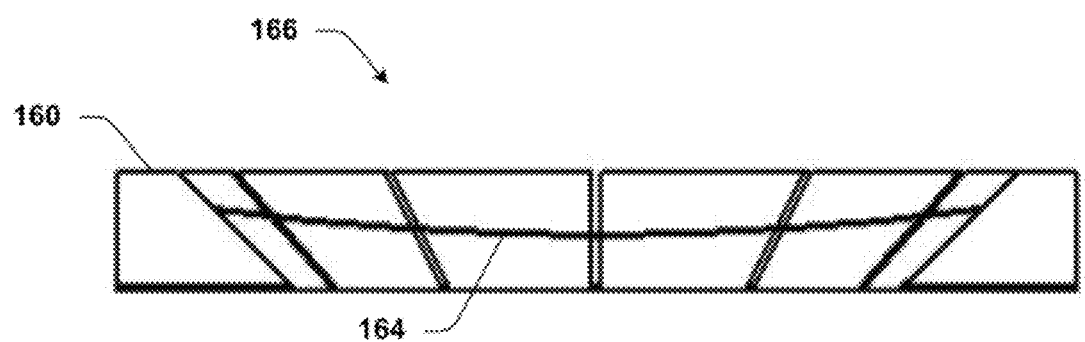

Irrespective of the type of liquid lens that is used, various controllability characteristics of the liquid lens may be advantageously employed in accordance with the teachings of the present disclosure. For example, in some embodiments, one or both of the illuminating or targeting fields may be controllably focused, steered, or directed by controllably adjusting the at least one liquid lens. FIGS. 5 and 6 show side cross-sectional views of a liquid lens 160 being controlled to two various configurations to provide various output beams in accordance with the teachings of the present disclosure. More specifically, in a first configuration 162 shown in FIG. 5, the liquid lens 160 is controllably adjusted, such as by adjusting one or more voltages applied around a periphery of a liquid-liquid interface 164, so that the liquid-liquid interface 164 becomes relatively more concave, thus changing (e.g. shortening) an overall focal length of the liquid lens 160. Similarly, in a second configuration 166 shown in FIG. 6, the liquid lens 160 is controllably adjusted such that the liquid-liquid interface 164 becomes relatively less concave, thus changing (e.g. lengthening) the overall focal length of the liquid lens 160.

Alternately, FIGS. 5 and 6 may represent two different views of the liquid lens 160 along two different viewing axes at the same time. For example, FIG. 5 may represent a first view 162 along a first viewing axis (e.g. an x axis) and FIG. 6 may represent a second view 166 along a second viewing axis (e.g. a y axis). In this way, FIGS. 5 and 6 demonstrate that the liquid lens 160 may be controlled to controllably adjust a shape of the liquid-liquid interface 164 to provide various non-axisymmetric beam shapes.

Additional controllability aspects are shown in FIGS. 7 and 8 in accordance with the teachings of the present disclosure. More specifically, FIG. 7 shows a side cross-sectional view of a liquid lens 170 being controllably adjusted into a first configuration 172, such as by adjusting one or more voltages applied around a periphery of a fluid interface 174. In the first configuration 172, the liquid lens 170 operates to process an incoming beam 175 to provide a first output beam 177. The first output beam 177 may be a diverging output beam such as may be used as an illuminating field in accordance with the teachings of the present disclosure. FIG. 8 shows a side cross-sectional view of the liquid lens 170 being controllably adjusted into a second configuration 176 such that the fluid interface 174 is conformed into a non-axisymmetric configuration. In the second configuration 176, the liquid lens 170 processes the incoming beam 175 to provide a second output beam 179.

Comparison of the first and second output beams 177, 179 (FIGS. 7 and 8) show that, in at least some embodiments, the liquid lens 170 may be controllably adjusted to provide steering of the output beams 177, 179 as desired. Although the output beams 177, 179 shown in FIGS. 7 and 8 are depicted as relatively-rapidly diverging beams, such as may be suitably used as illuminating beams, it will be appreciated that in alternate embodiments, the output beams 177, 179 may be adjusted to be less-rapidly diverging beams, such as may be suitably used as targeting beams in accordance with the teachings of the present disclosure. In addition, it will be appreciated that liquid lenses may be controllably adjusted to alternately provide axisymmetric illuminating fields and axisymmetric targeting fields (without steering) in accordance with the teachings of the present disclosure.

Figure 9:
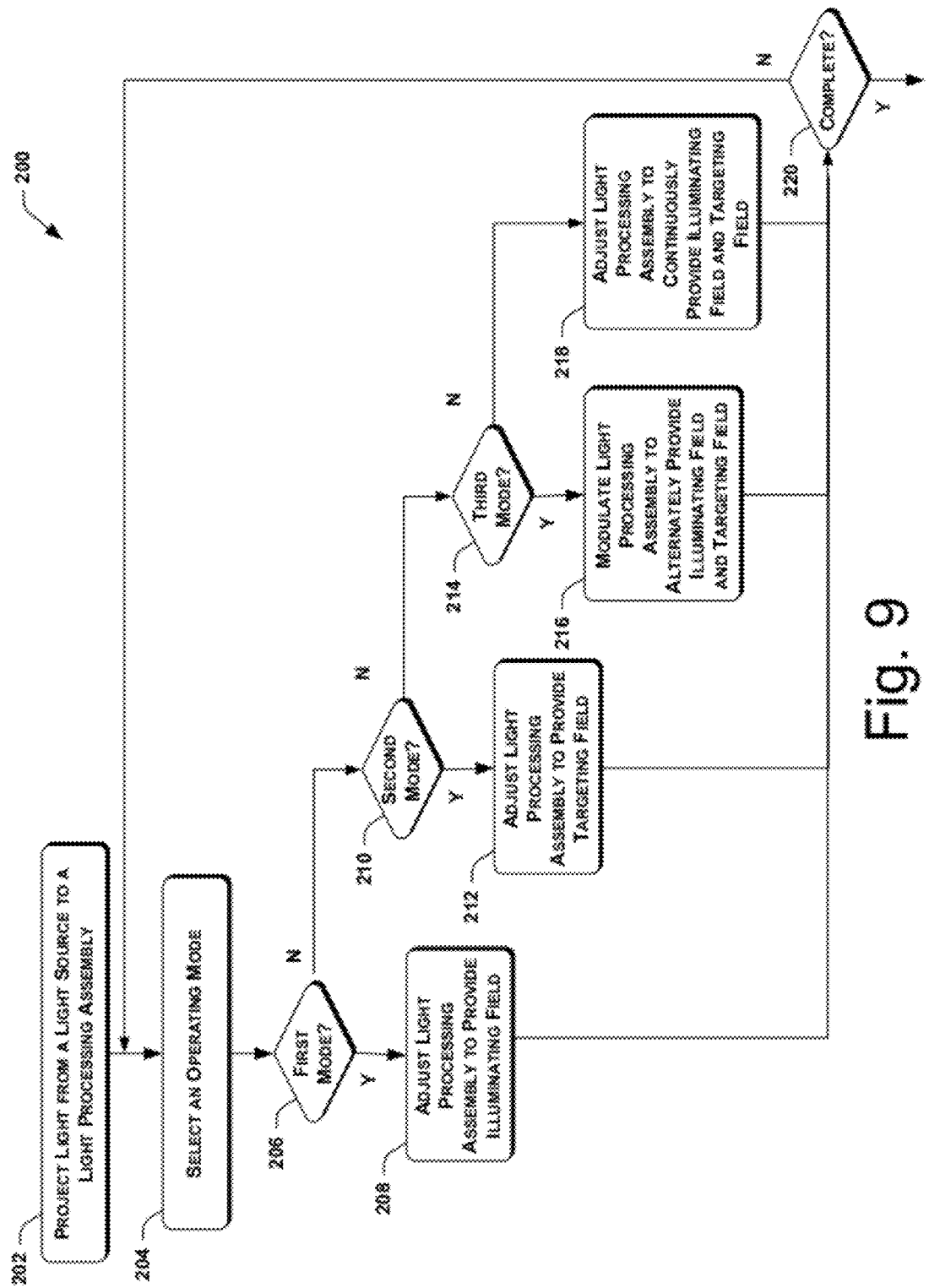
FIG. 9 is a flowchart of an exemplary embodiment of a method of operating a system in accordance with the teachings of the present disclosure.

FIG. 9 is a flowchart of an exemplary embodiment of a method 200 of operating a system (e.g. system 100) in accordance with the teachings of the present disclosure. In this embodiment, the method 200 includes projecting light from a light source to a light processing assembly at 202. At 204, an operating mode is selected. Next, a determination is made at 206 whether a first mode of operation was selected. If the first mode of operation was selected, then a light processing assembly is adjusted to provide an illuminating field at 208.

If the first mode of operation was not selected, then a determination is made at 210 whether a second mode of operation was selected. If the second mode of operation was selected, then a light processing assembly is adjusted to provide a targeting field at 212.

As further shown in FIG. 9, if the second mode of operation was not selected, then a determination is made at 214 whether a third mode of operation was selected. If the third mode of operation was selected, then a light processing assembly is modulated to alternately provide an illuminating field and a targeting field at 216. As described above, in some embodiments, the light processing assembly may be rapidly oscillated such that an observer or viewing system may perceive that both the illuminating and targeting fields are projected simultaneously as depicted in FIG. 1, when in fact the fields are being rapidly alternated. Furthermore, in some embodiments, the light processing assembly may be controlled to cause a slight dwell time at the two adjustment extremes (narrow and wide), which may aid in impressing upon the observer or viewing system that the illuminating and targeting fields appear to exist simultaneously. More specifically, in some embodiments, the light processing assembly may be controlled to independently adjust at least one dwell time at the illuminating and targeting fields in order to independently adjust a brightness of the illuminating and targeting fields, respectively. In further embodiments, the light processing assembly may be controlled to independently steer one or more of the illuminating and targeting fields as desired.

Finally, in this embodiment, if the third mode of operation was not selected (at 214), then the method 200 defaults to adjusting the light processing assembly to continuously and simultaneously providing an illuminating field and a targeting field at 218. After the light processing assembly is adjusted to the desired operating mode at any of 208, 212, 216, or 218, the method 200 determines whether operations are complete at 220. If not, the method 200 returns to selecting an operating mode at 204, and the above-noted activities are repeated indefinitely. Once operations are determined to be complete at 220, the method 200 continues to other activities or terminates.

It will be appreciated that the method 200 described above and shown in FIG. 9 is merely exemplary and that many alternate embodiments of methods may be conceived in accordance with the teachings of the present disclosure. For example, one or more of the above-described activities may be omitted, or the order of one or more of the above-described activities may be changed to provide further embodiments of methods in accordance with the teachings of the present disclosure.

Embodiments of systems and methods in accordance with the teachings of the present disclosure may provide considerable advantages over conventional systems having glass optical components. For example, since traditional glass optics cannot typically be adjusted quickly enough, systems and methods in accordance with the present disclosure may advantageously enable rapidly varying adjustment of a light processing assembly between a first configuration that may be used to project an illuminating field, and a second configuration that may be used to project a targeting field, in an oscillatory manner. In some implementations, systems and methods in accordance with the present disclosure may be cycled at a suitably high frequency (e.g. 30 Hz, 60 Hz, etc.) such that the illuminating and targeting fields appear to an average human observer or viewing system to be projected substantially simultaneously.

Figure 10:
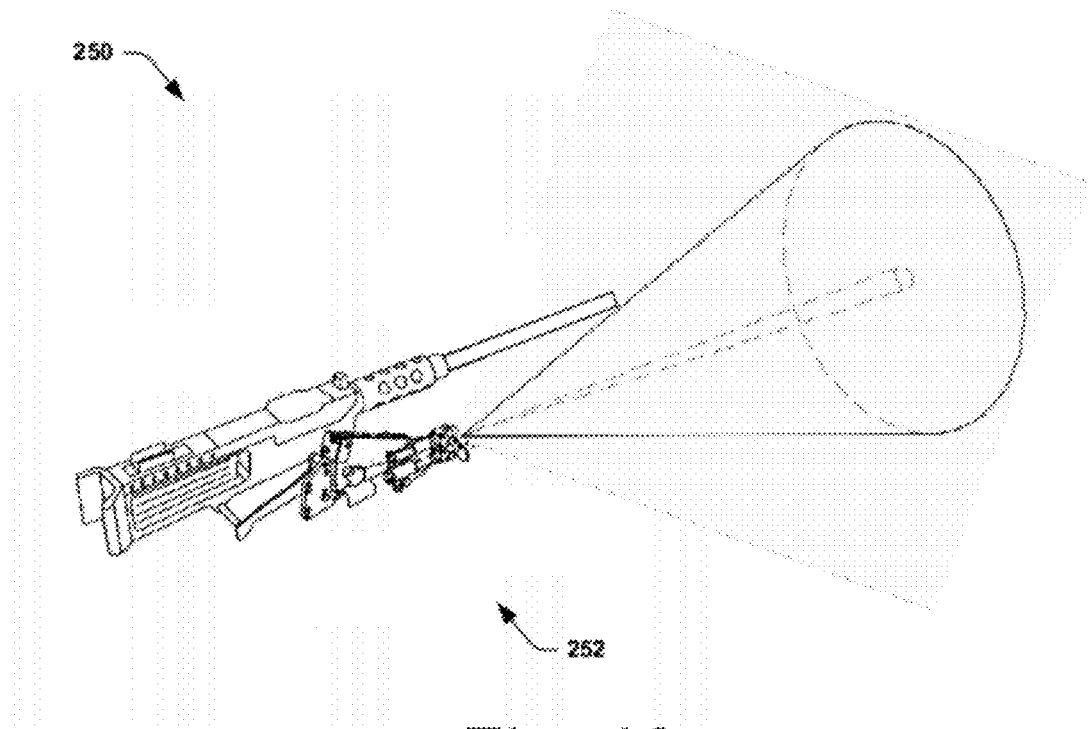
FIGS. 10 and 11 show exemplary weapon systems in which systems and methods in accordance with the teachings of the present disclosure may be implemented.
Figure 11:
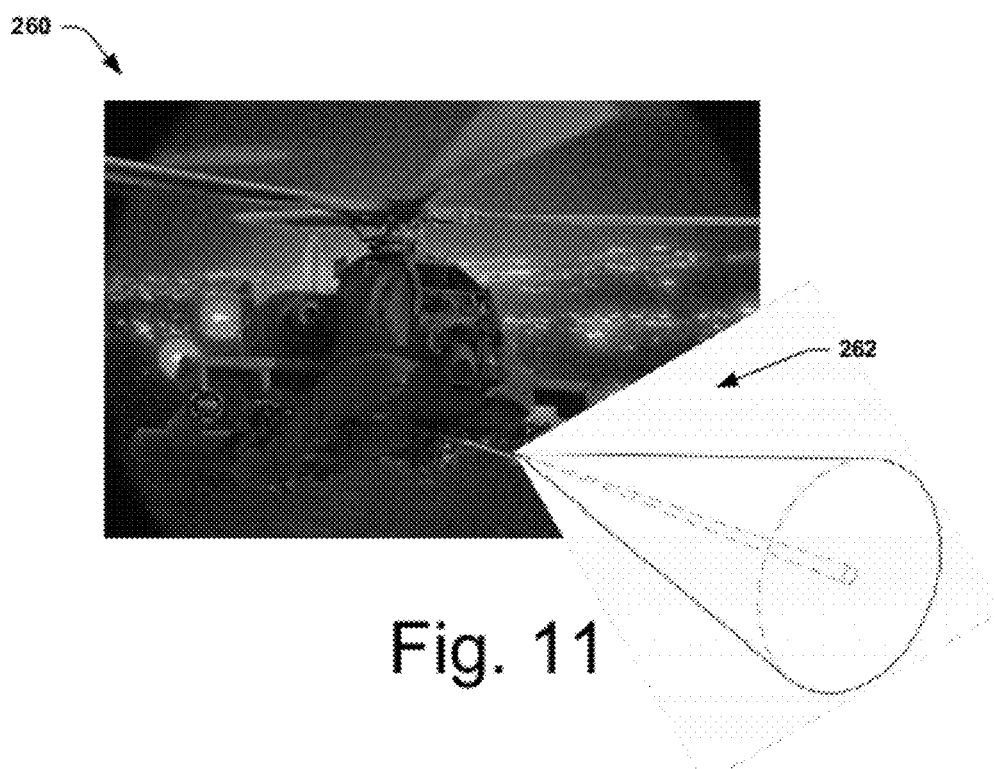

Systems and methods for projecting illuminating and targeting fields in accordance with the teachings of the present disclosure may be incorporated into a wide variety of systems and environments, including a variety of weapons systems. For example, FIG. 10 shows a machine gun 250 equipped with a light projecting system 252 in accordance with the teachings of the present disclosure. Alternately, FIG. 11 shows an aircraft 260 equipped with a light projecting system 262 in accordance with the teachings of the present disclosure. Of course, the weapons systems 250, 260 shown in FIGS. 10 and 11 are merely exemplary, and that a wide variety of suitable weapons systems may be conceived that may be equipped with light projecting systems in accordance with the teachings of the present disclosure.

It will be appreciated that the detailed descriptions of the above embodiments are not exhaustive descriptions of all embodiments contemplated by the inventors to be within the scope of the invention. Indeed, it will be recognized that certain aspects or elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the present disclosure. Accordingly, the scope of the invention should be determined from the following claims.

What is claimed is:

1. A light projecting system, comprising:
   a light source; and
   a light processing assembly configured to receive a light beam from the light source and to project an output field, the light processing assembly including at least one liquid lens configured to controllably process the light beam such that the output field is variable between a relatively-broader illuminating field and a relatively-narrower targeting field,
   wherein the at least one liquid lens is further configured to be cycled between a first configuration that provides the illuminating field and a second configuration that provides the targeting field in at least one mode such that the illuminating and the targeting fields appear to be projected simultaneously to at least one of an ordinary human observer or a viewing system.

2. The light projecting system of claim 1, wherein the at least one liquid lens is further configured to be controllably adjusted between the first configuration that provides the illuminating field and the second configuration that provides the targeting field.

3. The light projecting system of claim 1, further comprising:
   a controller configured to provide at least one control signal to the light processing assembly to controllably adjust the output field.

4. The light projecting system of claim 1, further comprising:
   a controller configured to controllably adjust the light processing assembly to provide at least one of the illuminating field, the targeting field, or to cyclically alternate between the illuminating field and the targeting field.

5. The light projecting system of claim 1, further comprising:
   a controller configured to controllably adjust the light processing assembly to cyclically alternate between the illuminating field and the targeting field, including at least one dwell time at the illuminating and targeting fields.

6. The light projecting system of claim 5, wherein the controller is further configured to independently adjust the at least one dwell time at the illuminating and targeting fields in order to independently adjust a brightness of the illuminating and targeting fields, respectively.

7. The light projecting system of claim 5, wherein the controller is further configured to controllably adjust the light processing assembly in at least one mode such that the illuminating and targeting fields appear to be projected simultaneously to at least one of an ordinary human observer or a viewing system.

8. The light projecting system of claim 5, wherein the controller is further configured to controllably adjust the light processing assembly such that at least one of the illuminating or targeting fields is at least one of focused, steered, directed, non-axi-symmetrically shaped, or non-symmetrically shaped.

9. The light projecting system of claim 1, wherein the liquid lens includes at least one lens that is variably adjusted by varying at least one of an applied voltage or an applied pressure.

10. The light projecting system of claim 1, wherein the liquid lens includes at least one of:
    at least two non-miscible liquids, at least one of the liquids being electrically conductive;
    a non-electrically conductive liquid configured to be variably focused by controllably adjusting an applied voltage;
    a liquid-liquid interface that is varied in shape by one or more piezoelectric actuators; or
    a liquid layer having varying optical properties by varying a pressure applied to the liquid.

11. A method of projecting light, comprising:
    projecting light from a light source to a light processing assembly; and
    controllably adjusting at least one liquid lens of the light processing assembly to project an output field, the output field being variable between a relatively-broader illuminating field and a relatively-narrower targeting field,
    wherein controllably adjusting at least one liquid lens of the light processing assembly includes:
    cyclically adjusting at least one liquid lens between a first configuration that provides the illuminating field and a second configuration that provides the targeting field in at least one mode such that the illuminating and the targeting fields appear to be projected simultaneously to at least one of an ordinary human observer or a viewing system.

12. The method of claim 11, wherein controllably adjusting at least one liquid lens of the light processing assembly includes:
    controllably adjusting at least one liquid lens between the first configuration that provides the illuminating field and the second configuration that provides the targeting field.

13. The method of claim 11, wherein controllably adjusting at least one liquid lens of the light processing assembly includes:
    providing at least one control signal from a controller to the light processing assembly to controllably adjust the output field.

14. The method of claim 11, wherein controllably adjusting at least one liquid lens of the light processing assembly includes:
    controllably adjusting the light processing assembly using a controller to provide at least one of the illuminating field, the targeting field, or to cyclically alternate between the illuminating field and the targeting field.

15. The method of claim 11, wherein controllably adjusting at least one liquid lens of the light processing assembly includes:
    controllably adjusting the light processing assembly using a controller to cyclically alternate between the illuminating field and the targeting field, including at least one dwell time at the illuminating and targeting fields.

16. The method of claim 15, wherein controllably adjusting the light processing assembly using a controller to cyclically alternate between the illuminating field and the targeting field, including at least one dwell time at the illuminating and targeting fields includes:
    independently adjusting the at least one dwell time at the illuminating and targeting fields in order to independently adjust a brightness of the illuminating and targeting fields, respectively.

17. The method of claim 11, wherein controllably adjusting the light processing assembly using a controller includes:
    using the controller to controllably adjust the light processing assembly in at least one mode such that the illuminating and targeting fields appear to be projected simultaneously to at least one of an ordinary human observer or a viewing system.

18. The method of claim 11, wherein controllably adjusting at least one liquid lens of the light processing assembly includes:
controllably adjusting the at least one liquid lens by varying at least one of an applied voltage or an applied pressure.

19. The method of claim 11, wherein controllably adjusting at least one liquid lens of the light processing assembly includes:
controllably adjusting the at least one liquid lens such that at least one of the illuminating or targeting fields is at least one of focused, steered, directed, non-axi-symmetrically shaped, or non-symmetrically shaped.

20. The method of claim 11, wherein controllably adjusting at least one liquid lens of the light processing assembly includes controllably adjusting at least one liquid lens that includes at least one of:
at least two non-miscible liquids, at least one of the liquids being electrically conductive;
a non-electrically conductive liquid configured to be variably focused by controllably adjusting an applied voltage;
a liquid-liquid interface that is varied in shape by one or more piezoelectric actuators; or
a liquid layer having varying optical properties by varying a pressure applied to the liquid.

* * * * *